Patented Nov. 28, 1922.

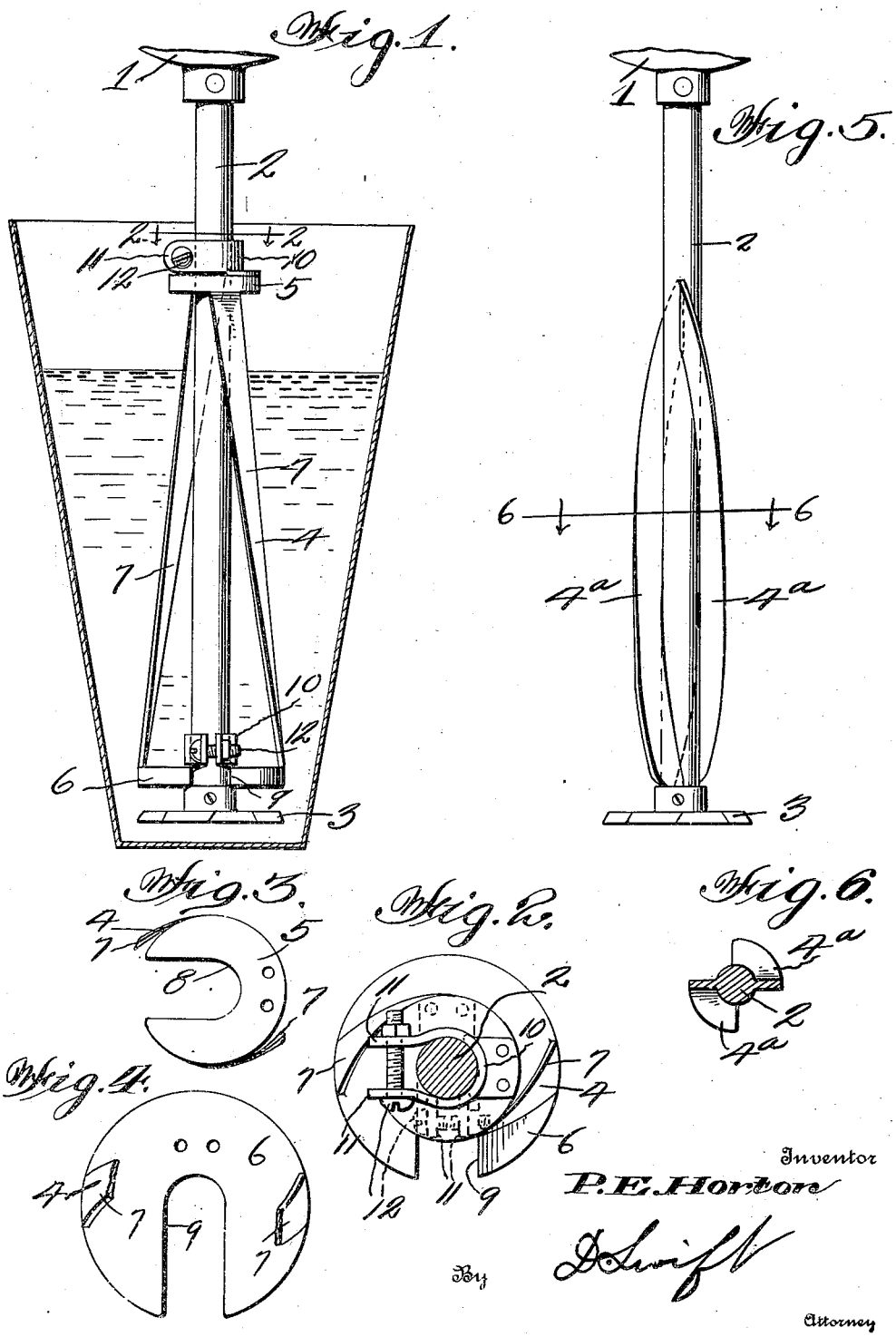

1,437,246

UNITED STATES PATENT OFFICE.

PLEAS E. HORTON, OF DALLAS, TEXAS.

AGITATOR FOR MALTED-MILK MACHINES.

Application filed August 1, 1922. Serial No. 578,942.

*To all whom it may concern:*

Be it known that I, PLEAS E. HORTON, a citizen of the United States, residing at Dallas, in the county of Dallas, State of Texas, have invented a new and useful Agitator for Malted-Milk Machines; and I do hereby declare the following to be a full, clear, and exact description of the invention, such as will enable others skilled in the art to which it appertains to make and use the same.

The invention relates to agitators for agitating machines of the character used for stirring malted milk and the like before dispensing, and has for its object to provide the shaft of the machine with blades above the stirring disc, and forming means for thoroughly agitating the material in the minimum amount of time.

A further object is to provide, in combination with an agitator shaft, agitator blades, which blades are carried by slotted discs which receive the agitator shaft and clamping members carried by the disc for securely clamping the disc to the shaft.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the agitator shaft showing the removable agitator and showing the device disposed in a glass.

Figure 2 is a sectional view taken on line 2—2 of Figure 1.

Figure 3 is a top plan view of the upper disc showing the clamp removed therefrom.

Figure 4 is a top plan view of the lower disc showing the clamp removed.

Figure 5 is a side elevation of the agitator shaft, showing the spiral agitator blades formed integral with the agitator shaft.

Figure 6 is a horizontal sectional view taken on line 6—6 of Figure 5.

Referring to the drawing, the numeral 1 designates a portion of a conventional form of malted milk agitating machine and 2 a vertically disposed agitating shaft rotated thereby. The lower end of the shaft 2 is provided with a conventional form of agitating disc 3. It has been found that where an agitating disc 3 is used that the agitating or stirring operation is extremely slow and consumes considerable time, which is a decided disadvantage in place where beverages are dispensed and where the item of time is a material one in waiting on customers. To obviate this difficulty the agitator shaft is provided with a removable agitator 4 which is constructed that it may be easily attached to agitator shafts of machines now in use. The agitator device 4 comprises an upper disc 5, a lower disc 6 and spirally extending blades 7. The upper ends of the blades 7 are attached to the upper disc 5 and the lower ends of the blades are attached to the disc 6. The disc 5 is provided with a recess 8 for the reception of the shaft 2 and the disc 6 is provided with a recess 9 which also receives the shaft 2, in such a manner that the shaft 2 will extend axially through the attachment 4. It will be noted that the recess 8 is at substantially a right angle to the recess 9 incident to the spiral arrangement of the blade 7. In placing the device on the shaft 2 the recess 9 is first positioned to receive the shaft 2 after the shaft 2 is in the recess 9 and the upper end of the shaft 2 is placed in the bottom of the recess 8, the recesses being preferably slightly larger than the shaft. Secured to the upper disc 5 and to the lower disc 6 are U-shaped clamping members 10, the arms 11 of which engage opposite sides of the shaft 2 and when sprung together by means of the bolts 12 securely clamp the attachment 4 on the shaft 2. Arms 11 have sufficient spring action to allow spreading of the U-shaped members 10 sufficiently to allow the members 10 to receive the shaft 2.

Referring to Figures 5 and 6 wherein a modified form of agitator is provided, it will be seen that the agitator blades 4ª are formed spirally and integrally on the shaft 2, and in combination with the disc 3 will thoroughly and quickly agitate the material.

From the above it will be seen that a malted milk machine attachment is provided wherein malted milk or other material will be thoroughly agitated and in the minimum amount of time. It will also be seen that the device will be easily and quickly attached or detached to an agitator shaft of the character set forth.

The invention having been set forth what is claimed as new and useful is:—

The combination with a vertically disposed agitating shaft, an agitator disc carried by the lower end of the shaft, of an agitator carried by the shaft above the agitator disc, said agitator comprising spaced recessed discs having their recesses at angles to each other, spirally arranged blades connecting the spaced discs together, U-shaped clamping members carried by the spaced discs and adapted to receive the shaft, and means passing through the ends of the U-shaped clamping members and forming means whereby the clamping members may be securely clamped on the shaft.

In testimony whereof I have signed my name to this specification in the presence of two subscribing witnesses.

PLEAS E. HORTON.

Witnesses:
C. E. GRIMES,
C. E. HISE.